US009183359B2

(12) United States Patent
Schmidt et al.

(10) Patent No.: US 9,183,359 B2
(45) Date of Patent: Nov. 10, 2015

(54) METHOD AND APPARATUS FOR ASSIGNING AND RELEASING LICENSES

(75) Inventors: Nancy K. Schmidt, Broomfield, CO (US); William T. Walker, Evergreen, CO (US)

(73) Assignee: Avaya Inc., Basking Ridge, NJ (US)

( * ) Notice: Subject to any disclaimer, the term of this patent is extended or adjusted under 35 U.S.C. 154(b) by 1028 days.

(21) Appl. No.: 13/151,042

(22) Filed: Jun. 1, 2011

(65) Prior Publication Data

US 2012/0311155 A1 Dec. 6, 2012

(51) Int. Cl.
*G06F 15/173* (2006.01)
*G06F 21/10* (2013.01)

(52) U.S. Cl.
CPC .................. *G06F 21/105* (2013.01)

(58) Field of Classification Search
CPC .......................... G06F 15/173; G06F 21/105
See application file for complete search history.

(56) References Cited

U.S. PATENT DOCUMENTS

| 6,785,885 | B2 | 8/2004 | Norris et al. |
| 7,260,557 | B2 | 8/2007 | Chavez |
| 2004/0172367 | A1 | 9/2004 | Chavez |
| 2006/0242083 | A1* | 10/2006 | Chavez ........................... 705/59 |
| 2007/0288389 | A1* | 12/2007 | Vaughan et al. ................ 705/59 |
| 2008/0189131 | A1 | 8/2008 | Chavez |
| 2010/0265825 | A1* | 10/2010 | Blair et al. .................... 370/236 |

* cited by examiner

*Primary Examiner* — Shripal Khajuria
*Assistant Examiner* — Farhad Ali
(74) *Attorney, Agent, or Firm* — Sheridan Ross P.C.

(57) ABSTRACT

Methods and systems for allocating licenses to devices are provided. More particularly, the devices included in a system may each require a license having a release value that is equal to or greater than the release value of the device in order to be fully operational. Upon the unregistration of a device, the highest cost or value license that can be made available while maintaining proper registration of the remaining registered devices is freed. More particularly, the difference between the number of devices registered and the licenses used is calculated for each release value. A variance for each release value, beginning with the least cost or lowest release value license and working towards the highest cost or value license is then calculated. The highest cost license that can be released is equal to the license value for which the calculated variance is equal to zero.

20 Claims, 13 Drawing Sheets

Example 1

| | Release | Registered | Purchased | Used | Extra/Short | Variance | Best |
|---|---|---|---|---|---|---|---|
| 508a | R1 | 7 | 5 | 5 | -2 | -2 | R4 |
| 508b | R2 | 7 | 5 | 5 | -2 | -4 | R4 |
| 508c | R3 | 5 | 5 | 5 | 0 | -4 | R4 |
| 508d | R4 | 1 | 5 | 5 | 4 | 0 | R4 |
| 508e | R5 | 2 | 5 | 2 | 0 | 0 | R5 |
| 508f | R6 | 3 | 5 | 3 | 0 | 0 | R6 |
| 508g | R7 | 6 | 5 | 5 | -1 | -1 | Any |
| 508h | Any | | 3 | 1 | 1 | 0 | |

Fig. 5

Example 2

| Release | Registered | Purchased | Used | Extra/Short | Variance | Best |
|---|---|---|---|---|---|---|
| R1 | 7 | 5 | 5 | -2 | -2 | Any |
| R2 | 7 | 5 | 5 | -2 | -4 | Any |
| R3 | 5 | 5 | 5 | 0 | -4 | Any |
| R4 | 1 | 5 | 3 | 2 | -2 | Any |
| R5 | 4 | 5 | 4 | 0 | -2 | Any |
| R6 | 1 | 5 | 1 | 0 | -2 | Any |
| R7 | 6 | 5 | 5 | -1 | -3 | Any |
| Any | | 3 | 3 | 3 | 0 | |

Example 3

| Release | Registered | Purchased | Used | Extra/Short | Variance | Best |
|---|---|---|---|---|---|---|
| R1 | 6 | 5 | 5 | -1 | -1 | R5 |
| R2 | 5 | 5 | 5 | 0 | -1 | R5 |
| R3 | 5 | 5 | 5 | 0 | -1 | R5 |
| R4 | 3 | 5 | 3 | 0 | -1 | R5 |
| R5 | 4 | 5 | 5 | 1 | 0 | R5 |
| R6 | 1 | 5 | 1 | 0 | 0 | R6 |
| R7 | 5 | 5 | 5 | 0 | 0 | R7 |
| Any | | 0 | 0 | 0 | | |

Fig. 7

Example 4

| Release | Registered | Purchased | Used | Extra/Short | Variance | Best |
|---------|------------|-----------|------|-------------|----------|------|
| R1 | 5 | 5 | 5 | 0 | 0 | R1 |
| R2 | 5 | 5 | 5 | 0 | 0 | R2 |
| R3 | 5 | 5 | 5 | 0 | 0 | R3 |
| R4 | 3 | 5 | 3 | 0 | 0 | R4 |
| R5 | 2 | 5 | 1 | -1 | -1 | R7 |
| R6 | 3 | 5 | 1 | -2 | -3 | R7 |
| R7 | 2 | 5 | 5 | 3 | 0 | R7 |
| Any | | 0 | 0 | 0 | | |

Example 5

| Release | Registered | Purchased | Used | Extra/Short | Variance | Best |
|---------|------------|-----------|------|-------------|----------|------|
| R1 | 0 | 5 | 5 | 0 | 0 | |
| R2 | 7 | 5 | 5 | -2 | -2 | R6 |
| R3 | 5 | 5 | 5 | 0 | -2 | R6 |
| R4 | 1 | 5 | 2 | 1 | -1 | R6 |
| R5 | 4 | 5 | 4 | 0 | -1 | R6 |
| R6 | 3 | 5 | 4 | 1 | 0 | R6 |
| R7 | 3 | 5 | 0 | -3 | -3 | Any |
| Any | | 3 | 3 | 3 | 0 | |

Fig. 9

Example 6

| Release | Registered | Purchased | Used | Extra/Short | Variance | Best |
|---|---|---|---|---|---|---|
| R1 | 0 | 5 | 0 | 0 | 0 | |
| R2 | 7 | 5 | 5 | -2 | -2 | R6 |
| R3 | 5 | 5 | 5 | 0 | -2 | R6 |
| R4 | 1 | 5 | 2 | 1 | -1 | R6 |
| R5 | 4 | 5 | 4 | 0 | -1 | R6 |
| R6 | 3 | 5 | 4 | 1 | 0 | R6 |
| R7 | 8 | 5 | 5 | -3 | -3 | R6 |
| Any | | 3 | 3 | 3 | 0 | Any |

Example 7

| Release | Registered | Purchased | Used | Extra/Short | Variance | Best |
|---|---|---|---|---|---|---|
| R1 | 0 | 5 | 5 | 0 | 0 | |
| R2 | 0 | 5 | 5 | 0 | 0 | R7 |
| R3 | 0 | 5 | 5 | 0 | 0 | R7 |
| R4 | 6 | 5 | 5 | -1 | -1 | R7 |
| R5 | 5 | 5 | 5 | 0 | -1 | R7 |
| R6 | 5 | 5 | 5 | 0 | -1 | R7 |
| R7 | 4 | 5 | 5 | 1 | 0 | Any |
| Any | | 3 | 0 | 0 | | |

Example 8

| Release | Registered | Purchased | Used | Extra/Short | Variance | Best |
|---------|-----------|-----------|------|-------------|----------|------|
| R2      |           |           |      |             | 0        |      |
| R3      | 6         | 5         | 5    | -1          | -1       | R4   |
| R4      | 4         | 5         | 5    | 1           | 0        | R4   |
| R5      | 6         | 5         | 5    | -1          | -1       | R6   |
| R6      | 4         | 5         | 5    | 1           | 0        | R6   |
| R7      | 8         | 5         | 5    | -3          | -3       | Any  |
| Any     |           | 3         | 3    | 3           | 0        |      |

Example 9

| Release | Registered | Purchased | Used | Extra/Short | Variance | Best |
|---|---|---|---|---|---|---|
| R2 | 1 | 5 | 0 | -1 | -1 | R3 |
| R3 | 4 | 5 | 5 | 1 | 0 | R3 |
| R4 | 6 | 5 | 5 | -1 | -1 | R5 |
| R5 | 4 | 5 | 5 | 1 | 0 | R5 |
| R6 | 6 | 5 | 6 | 0 | 0 | R6 |
| R7 | 6 | 5 | 5 | -1 | -1 | Any |
| R8 | 2 | 5 | 0 | -2 | -3 | Any |
| Any | 0 | 3 | 3 | 3 | 0 | |

METHOD AND APPARATUS FOR ASSIGNING AND RELEASING LICENSES

FIELD

This invention relates to licensing the use of device firmware and/or client software. More particularly, the invention relates to the allocation of right to use licenses to device firmware and/or client software.

BACKGROUND

Right to use (RTU) licenses are typically granted to devices, or more precisely to firmware or client software running on or executed by such devices, based on product ID and, optionally, a release number. Customers may purchase a number of licenses for each release for a given product ID. In conventional systems, endpoints may only use licenses having a matching release and product ID. As a result, if there are no more licenses available of the particular release and product ID for a device attempting to obtain a license, that device is denied registration. However, there may be licenses available for the same product ID but for another higher release. This causes customer dissatisfaction. Accordingly, it would be desirable to allow licenses held by the customer for the product ID and having a higher-valued release number to also be applied to the device seeking registration. The inability of current systems to allow licenses of different releases to be applied such that a device having the same or an older release value can use an available license is overly restrictive, in that it does not allow the customer to fully use all the licenses that have been purchased or otherwise acquired. Moreover, the customer will likely delay purchasing new licenses as a result.

A license gatekeeper can be programmed such that a device seeking registration is granted a license having the same or a higher-valued release value. In order to track the release level of the license assigned to the device, individual tracking of licenses is required. This solution requires memory and other resources, and is often unacceptable, for example where a system being administered includes a large number of devices to which licenses must be allocated in order for those devices to operate. In addition, such an arrangement can limit endpoints from registering if a device seeking registration requires a higher-value license release than is then available, even though a license having a release sufficient for another device that has instead been issued a higher-valued release license is available. That is, systems have not provided for the dynamic reallocation of licenses having different release values.

Other systems have addressed the assignment of licenses by associating individual licenses with individual devices. However, this method requires that customers purchase and hold licenses even for inactive devices. In order to overcome the need to track individual assignments of licenses, systems can charge the same amount for all releases of a license, in effect creating an "any release" license that can be applied to any device. However, this solution is unacceptable where system providers desire to charge different amounts for different releases or desire to sell upgrades to new releases, and to associate different features with the different releases.

SUMMARY

Embodiments of the present disclosure are directed to solving these and other problems and disadvantages of the prior art. According to embodiments of the present disclosure, systems and methods that provide for the dynamic allocation of licenses among devices are provided. More particularly, an algorithm is implemented that provides for the allocation of the least value license that is currently available and that is sufficient to register a device upon device registration. In addition, an algorithm is provided that makes available the highest value license that can be freed upon the unregistration of a device. Moreover, the algorithm allows for licenses of different release levels to be dynamically allocated among devices such that the lowest value yet acceptable and available license is assigned to a device upon registration, and that makes available the most valuable license that can be freed upon the unregistration of a device. As a result, a customer is able to experience a full and cost effective use of purchased or otherwise acquired licenses.

In connection with the assignment of licenses to devices, the license release that is consumed is the lowest release value license that is available and that is sufficient to enable use of the device being registered. For example, a release value of the license allocated to a registering device should be equal to or greater than the release value of the device. If a license having a release value equal to the release value of the device is available, that license is allocated. If a license having an equal release value to the release of the device is not available, the next highest available license release is allocated to the registering device. If no license having sufficient release value is available, the registration of the device is rejected.

In order to determine the license that is made available upon the unregistration of a device, the algorithm tracks the surplus or deficit of licenses to devices for each release level and value represented in the system. At each release level, the variance between licenses and devices for the previous release plus an amount equal to the number of licenses used minus the number of registered endpoints is calculated. The highest release value license that can be freed for an unregistering endpoint is found at the release level where the variance is zero.

Additional features and advantages of embodiments of the present disclosure will become more readily apparent from the following description, particularly when taken together with the accompanying drawings.

BRIEF DESCRIPTION OF THE DRAWINGS

FIGS. 5-13 are tables depicting exemplary license allocations in accordance with embodiments of the present disclosure.

DETAILED DESCRIPTION

Figure 1:
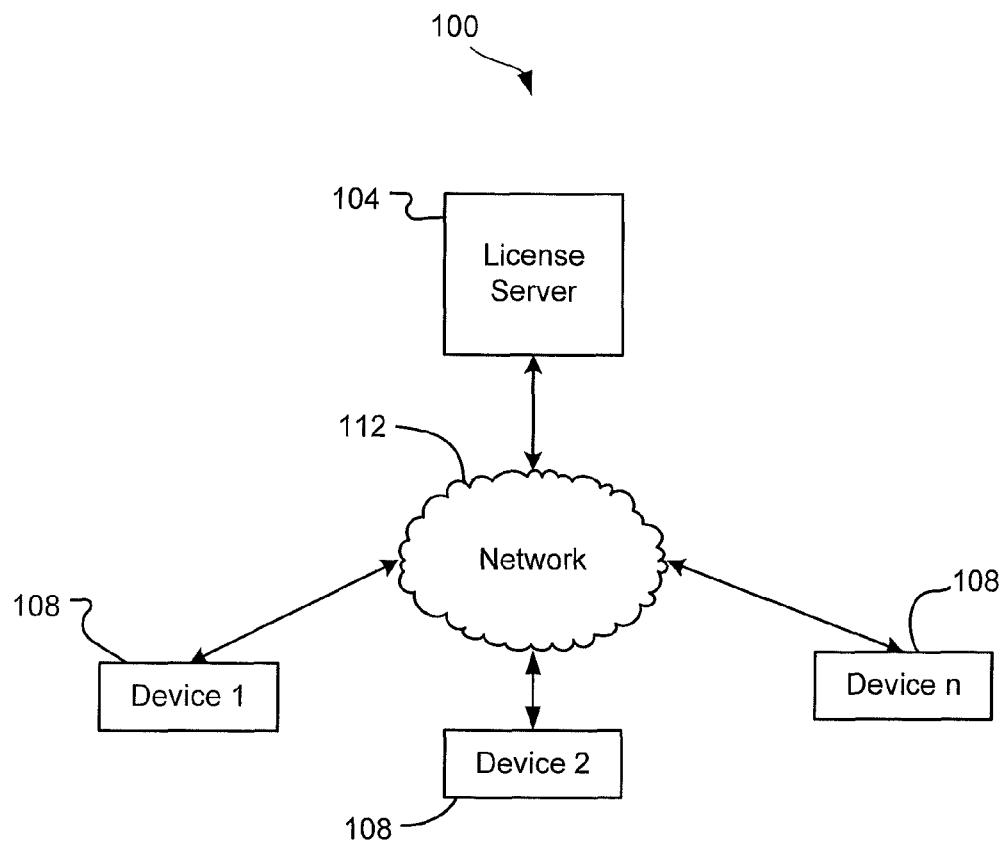
FIG. 1 depicts components of a licensing system in accordance with embodiments of the present disclosure.

FIG. 1 illustrates an exemplary system 100 incorporating features in accordance with embodiments of the present disclosure. In general, a licensing system 100 includes a license server 104 interconnected to a plurality of devices or endpoints 108 by a communication network 112. In general, as described in detail herein, the license server 104 operates to control the allocation of licenses to devices 108 in response to registration requests by the devices 108. The devices 108 may be associated with different release levels, and operation of an individual device 108 can require that the device hold or be assigned a license that is of the same or a greater release value. In addition, as also described in detail herein, the license server 104 operates to determine the release of its license that is made available when a device 108 unregisters. For purposes of illustration, and without limitation, the license server 104 can comprise a stand alone server device. In accordance with further embodiments, the license server 104 can be one of a number of functions provided by a server device to a system 100. For instance, the license server 104 can comprise a telecommunications switch or feature server. Devices 108 can include any device that requires association with a suitable license in order to operate. As an example but without limitation, devices 108 can include communication endpoints. For instance, the devices 108 can comprise telephones or other devices. Moreover, the devices 108 can be deployed as part, of a call center or other enterprise system. The network 112 can comprise any computer or communication network. For example, the network 112 can comprise a wire line or wireless Ethernet network, the Internet, a corporate intranet, or other network or combination of networks.

Figure 2:
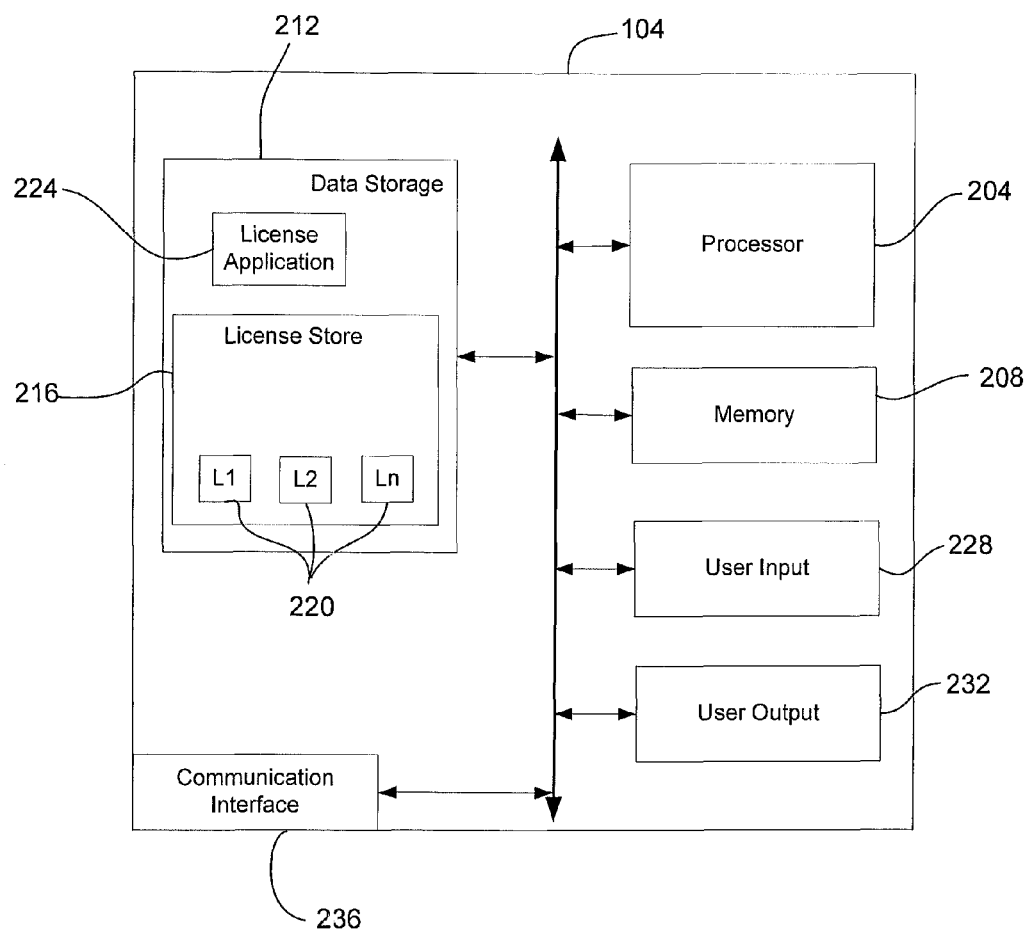
FIG. 2 depicts components of a license server in accordance with embodiments of the present disclosure.

FIG. 2 illustrates components of a license server 104 in accordance with embodiments of the present disclosure. In general, the license server 104 can comprise a general purpose computer or server device. Accordingly, the license server 104 can include a processor 204. The processor 204 may comprise a general purpose programmable processor or controller for executing application programming or instructions. As a further example, the processor 204 may comprise a specially configured application specific integrated circuit (ASIC). The processor 204 generally functions to run programming code or instructions implementing various functions of the license server 104.

A license server 104 may also include memory 208 for use in connection with the execution of application programming by the processor 204, and for the temporary or long term storage of program instructions and/or data. As examples, the memory 208 may comprise RAM, SDRAM, or other solid state memory. Alternatively or in addition, data storage 212 may be provided. In accordance with embodiments of the present disclosure, data storage 212 can contain program code or instructions implementing various of the applications or functions executed or performed by the license server 104. Like the memory 208, the data storage 212 may comprise a solid state memory device. Alternatively or in addition, the data storage 212 may comprise a hard disk drive or other random access memory.

In accordance with embodiments of the present disclosure, the data storage 212 can include various applications and data. For example, the data storage 212 can include a license store 216. Moreover, in accordance with embodiments of the present invention, the license store can include right to use licenses 220 (hereinafter referred to simply as licenses) that belong to or are associated with a particular release value or level. In the example of FIG. 2, licenses 220 belong to one of three different license releases L1, L2 and L3. However, the license store 216 can have a greater or lesser number of license releases included therein. In addition, different numbers of licenses in the different license releases can be included in the license store 220. For instance, there can be x number of release one (L1) licenses 220, y number of release two (L2) licenses 220, and z number of release three (L3) licenses 220. As described in greater detail elsewhere herein, different license releases can be required for different device 108 releases. Moreover, operation of a device 108 may be blocked if a license 220 of a suitable release level or value is not available. Although three different license 220 releases are depicted in FIG. 2, a server 104 in accordance with embodiments of the present invention can provide or operate in association with a license store 216 that has any number of different license 220 releases.

The data storage 212 of the license server 104 can also include a license distribution application 224. As described in greater detail elsewhere herein, the license distribution application 224 can operate to allocate licenses 220 to devices 108 upon receiving registration requests from or in association with registering devices 108. Moreover, as also described in greater detail elsewhere herein, the license application 224 can operate to determine the identity of a license 220, and in particular the release value of a license 220, that is freed or made available upon the unregistration of a device 108. In addition, the license distribution application 224 operates to make available the license 220 having a highest release value possible upon the unregistration of a device 108, thus allowing the system 100 to make full use of the features purchased or otherwise acquired by the system 100 operator.

The license server 104 can also include a user input 228 and a user output 232. Examples of a user input 228 include a keyboard, a mouse or other position encoding device, or other user input. An example of a user output 232 includes a display device, a speaker, or other user output. In general, input 228 and output 232 devices can be directly connected to a license server 104, or can be provided by a remote device, for example to allow a system administrator to interface with the license server 104. A license server 104 can additionally include a communication interface 236, for example for operatively interconnecting the license server 104 to devices 108 via the network 112. More particularly, the communication interface 236 can operate in connection with the assignment of licenses 220 to devices 108 in response to registration requests to enable operation of a registered device 108, and is connected with the release of licenses 220 upon the unregistration of a device 108, or other activity that results in a license 220 that was previously in use by a device 108 being relinquished or freed for use by another device 108.

Figure 3:
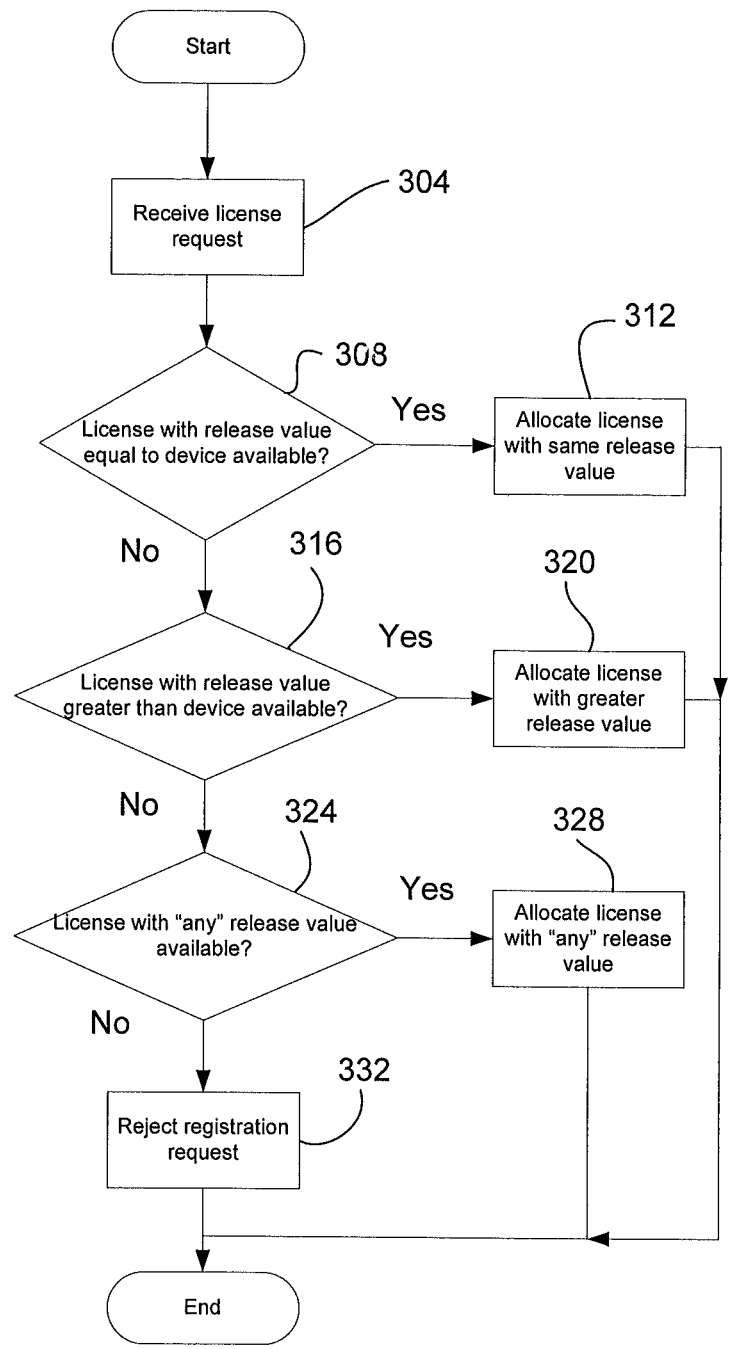
FIG. 3 is a flowchart depicting aspects of a process for allocating licenses in accordance with embodiments of the present disclosure.

With reference now to FIG. 3, a flowchart depicting aspects of a process for selecting a license 220 in response to a registration request from a device 108 in accordance with embodiments of the present disclosure is illustrated. The process for selecting a license seeks to make best use of the licenses 220 held by a system 100 by using the lowest cost licenses first to fulfill registration requests from devices 108. In particular, the lowest release license 220 that is available and that has the same or higher release as the registering device 108 is assigned to a device 108 making a registration request. Initially, a request for registration (i.e., a license 220 request) is received at the license server 104 (step 304). The request, which can be generated by a device 108, for instance upon boot-up or activation of the device 108, can include or be associated with a release level of the device 108 making the request. At step 308, a determination may be made as to whether licenses 220 are purchased or otherwise acquired and available at a release value or level that is equal to the release value or level of the device 108 requesting registration. If a license 220 of the same release level as the requesting device 108 is available, it is allocated to the requesting device 108 (step 312).

If a license 220 having the same release value as the release value of the requesting device 108 is not available, a determination may be made as to whether a license 220 with a greater release value than the release value of the requesting device 108 is available (step 316). If a license 220 with an incrementally greater release value is available, it is allocated to the requesting device 108 (step 320). Of the available licenses with a release value that is greater than the release of the registering device, the available license with the lowest release value is used.

If a license 220 with a release value that is greater than the release value of the requesting device 108 is not available, a determination may be made as to whether a license 220 with a value of "any" is available (step 324). A license 220 with an "any" release value is unlimited in that it can be assigned to a device 108 of any release value. If a license 220 with an "any" release value is available, it is allocated to the requesting device 108 (step 328). If no license with a release value of "any" is available, the registration request is rejected (step 332). After allocating a suitable license at steps 312, 320, or 328 in order to register the device 108, or after rejecting the registration request at step 332, the process may end. In accordance with other embodiments, the system 100 does not need to include or support licenses 220 having an "any" release value. According to such embodiments, the registration request is rejected after determining that there are no licenses 220 having a release value equal to or greater than the release value of the requesting device 108.

Figure 4:
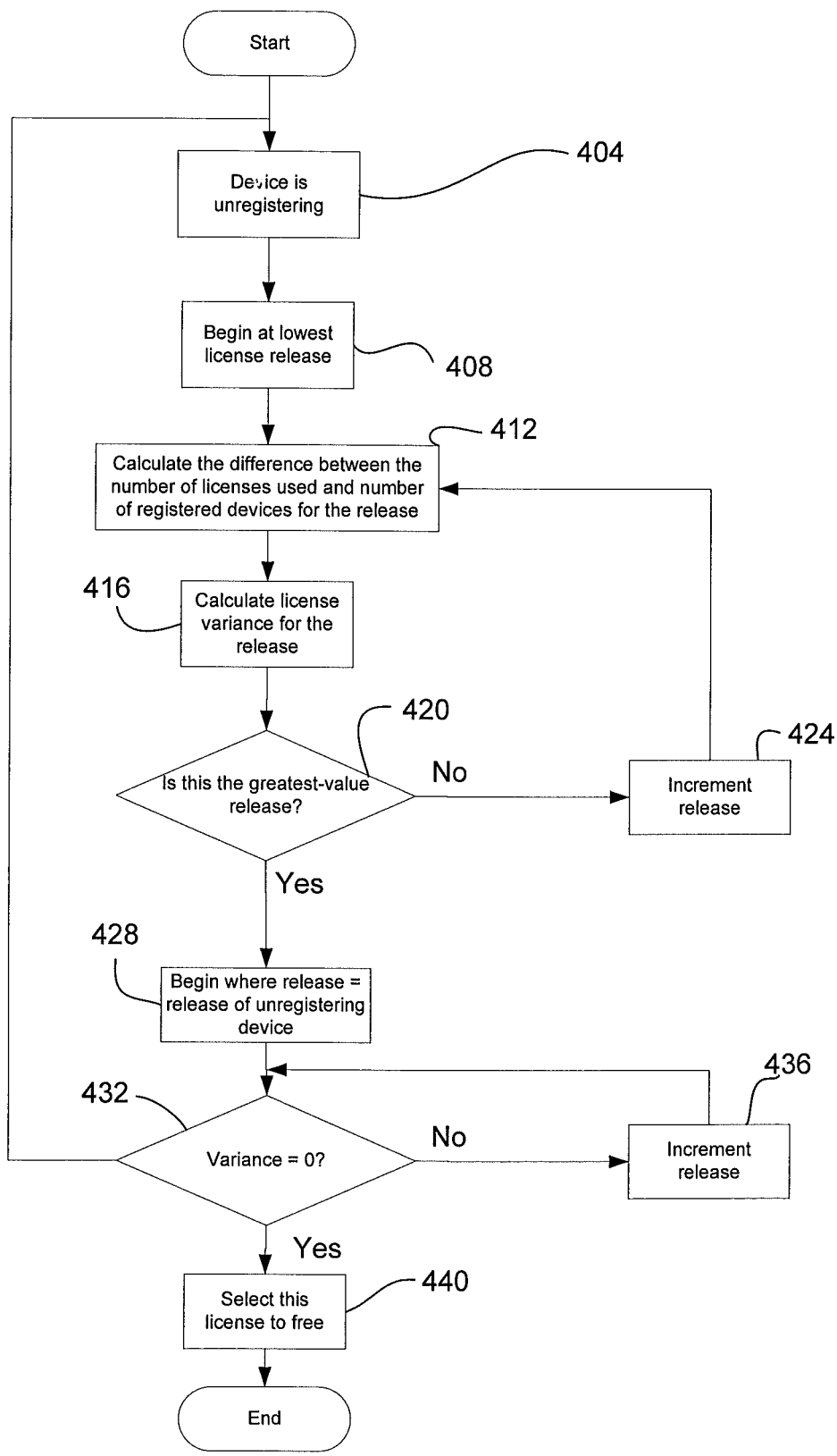
FIG. 4 is a flowchart depicting aspects of a process for freeing a license in accordance with embodiments of the present disclosure.

FIG. 4 is a flow chart depicting aspects of a process for freeing a license in response to the unregistration of a device 108 in accordance with embodiments of the present disclosure. In particular, the process determines the best (i.e., highest value) license 220 that can be freed upon the unregistration of a device 108 for each device 108 release level. The process begins when a device 108 is unregistering (step 404). In general, when a device 108 unregisters, a license 220 previously used by that device 108 becomes available for assignment to another device 108. In response to the unregistration of a device at step 404, the algorithm begins with or identifies the lowest license release value (step 408). For that lowest license release value, the difference between the number of licenses 220 used and the number of registered devices 108 for the release value is calculated (step 412). This value can be entered in a table. At step 416, the license variance for the release is calculated. The license variance for the release level can also be entered in a table. The variance at the lowest release level is equal to the difference between the number of licenses 220 used and the number or registered devices 108 at that lowest release value.

At step 420, a determination can be made as to whether the greatest value release is being considered. If the greatest value release has not yet been reached, the release is incremented (step 424), and the process returns to step 412, where the difference between the number of licenses used and the number of registered devices for the next release value is calculated, and then the license variance for that release value is calculated. For release values greater than the lowest release value, the license variance is equal to the variance of the previous release value plus the difference between the number of licenses used and the number of unregistered devices for the release value being considered. Accordingly, the variance is a cumulative value that can be different for each release level. Again, the variance for the release level under consideration can be stored in the table.

Once the greatest release value has been reached, the table in which the results of the calculations were entered is accessed at the release value that is equal to the release value of the unregistering device (step 428). At step 432, a determination is made as to whether the variance is equal to zero at the current release value. If the variance is not equal to zero, the release value is incremented (step 436), and the process returns to step 432 to determine whether the variance is equal to zero at the next release value. Once a release value is reached at which the variance is equal to zero, a license 220 at that release value or level is freed (step 440). Accordingly, the best or highest value license 220 that can be made available upon the unregistration of the device 108 is freed. The process then ends for the unregistering device.

This process can also be represented by the following pseudo code:

```
grel = greatest release of registered epts or licenses, not including 'any'
rel = current release we are working with
eptRel = endpoint release
rel = grel
signed short Short Extra [ ];
signed short LicenseVariance[ ];
// For each release, calculate the number of extra licenses and where we
// are short licenses.
rel = grel
Loop: for (rel=1; rel=grel; rel++)
    ShortExtra[rel] = licUsed[rel] − regEpts[rel]
// Calculate the license variance for each release starting at the
// lowest release.
LicenseVariance[1] = ShortExtra[1] ;
Loop: for (rel=2; rel=grel; rel++)
    LicenseVariance[rel] = LicenseVariance[ rel− 1] + ShortExtra[rel];
// Determine the license to free for the release of the unregistering
// endpoint.
// Do this by looking at the license variance for each release, starting
// at the endpoint's release number, as this is the lowest release license
// that can be freed for the endpoint. Then search upward looking for
// a variance of zero. This is the highest license that can be released
// for the endpoint.
license_to_free = eptRel;
Loop: for (rel=eptRel; LicenseVariance[rel] != 0; rel++)
    license_to_free = rel;
// or written as a while loop:
rel = eptRel;
Loop: while (LicenseVariance[rel]! = 0)
license_to_free = rel;
rel++
// We found the first zero license variance where the release
// is equal to or greater than the endpoint's release. Free a
// license of this release.
return license_to_free;
```

FIG. 5 is a table 504 that illustrates a system 100 environment using exemplary data. In this example system 100, there are seven release levels of devices 108. There are also seven specific levels or values of licenses 220, and licenses that have a value of "any". In order to operate a user device 108 must hold or be assigned a license 220 having a release value or level that is equal to or greater than the release value or level of the device 108. In addition, a license that has the value "any" can be assigned to a device 108 having any release level. In a first row of data 508a, the table of FIG. 5 shows that, for devices 108 having an R1 release value, there are seven devices 108, but only five licenses 220 that have a release value or level of one have been purchased or are available to the system 100. The number of R1 level licenses used is equal to five. Accordingly, the number of additional licenses needed for devices 108 that have a level one release level is two. Therefore, the Extra/Short is −2 and since this is the first row, the variance is also equal to −2.

In the second row 508b, associated with release level two, the number of registered devices 108 is equal to seven, and the number of licenses 220 having release value of two is equal to five. The number of licenses 220 having a release value of two in use is equal to five. Accordingly, two more licenses 220 having a release value of two or greater are required. Adding the number of the R2 licenses 220 that the system 100 is short to the number of R1 licenses that the system 100 is short under the present allocation of licenses results in a calculated variance of −4.

Moving to the next row 508c in the table, there are five registered devices 108 having a release value of three, and there are five licenses 220 having a release value of three. Moreover, all five of the licenses 220 having a release value of three are in use. Accordingly, no additional licenses at this level are needed, and likewise there are no extra licenses having a release value of three. Therefore, the variance remains −4.

As shown in the fourth row 508d, there is one device 108 having a release value of four registered in the system 100. However, there are five licenses 220 having a release value of four. Five of the licenses 220 having a release value of four are, in this example, in use. Accordingly, there are four extra licenses 220 having a release value of four. As a result, the variance goes to zero.

In the row 508e containing data for devices 108 having a release value of five, two devices 108 are shown as being registered and there are five licenses 220 having a release value of five. In this example, two licenses having a release value of five are in use. Accordingly, there are zero extra licenses 220 having a release value of five. As a result, the variance at the R5 release level is zero.

As shown in the sixth row 508f, there are three devices 108 having a release value of six. There are five licenses 220 having a release value of six that belong to the system 100, and three of those licenses are in use. Accordingly, at the R6 release level, the difference between the number of licenses used and the number of registered endpoints 108 is zero, and the variance of the system at the R6 level is zero.

In row 508g, the number of devices 108 having a release value of seven currently registered with the system 100 is shown as equal to six. The number of R6 licenses 220 available to the system is five, and all five of those R6 licenses are in use. The difference between the number of R7 licenses in use and the number of R7 devices 108 that are currently registered is −1. Adding this to the previously calculated variance of zero, the variance at the R7 release level is calculated to be −1.

In the row 508h, the allocation of licenses 220 having a release value of "any" is shown. In the system 100, no devices 100 are associated with a release value of "any". There are three "any" licenses 220 available to the system 100, and one of those licenses 220 is in use. Since there are no devices 108 registered as "any" release level devices 108, the difference between the number of licenses used and the number of registered endpoints is one. Adding this value to the previously calculated variance, the variance of the "any" level is equal to zero.

By referencing the table 504, a determination can be made as to the release value of the license 220 that should be freed in response to the unregistration of a device 108 at any release level. In particular, the last column 512 of the table 504 shows the best license 220 release level to free for each device 108 release level. As shown in table 504, the calculated variance is first equal to zero at the R4 release level. Therefore, as indicated in the last column 512 of the table 504, upon the unregistration of any device 108 having a release value of four or lower, an R4 license 220 is the best or highest value license that can be freed, and therefore the value of the license 220 deemed to be freed upon the unregistration of the device 108 with a value of four or lower is R4. That a license 220 having an R4 release value is the highest value license 220 that can be freed upon the unregistration of a device 108 with a level of R4 or lower can be verified by considering the number of higher-valued release endpoints or devices 108 that are registered. In particular, in this example there are two R5, three R6 and six R7 endpoints that must have licenses 220 having a value greater than R4. In the system 100, there are eleven licenses of value R5 or greater. Therefore, all of the R5, R6, R7 and "any" licenses 220 in use must be used by the eleven registered R5, R6 and R7 devices 108. Therefore, R4 is indeed the greatest license 220 that can be freed when an R4 level or lower device 108 unregisters. If an R5 level device 108 unregisters, the best license 220 that can be freed is an R5 license 220. Similarly, if an R6 device 108 unregisters the best license 220 that can be freed is an R6 license. If an R7 level device 108 unregisters, the table 504 shows that an "any" value license 220 can be freed.

The tables in FIGS. 6-13 illustrate additional example scenarios. As can be appreciated after consideration of the present disclosure, at least some of those examples depict allocations of licenses among registered devices that are not states that would be encountered during any normal operation of a system 100 using the algorithm of the present disclosure from a state of no devices registered. The system 100 may be in these states as a result of using an existing algorithm prior to the present disclosure. Additionally, the examples illustrate that embodiments of the disclosed invention are capable of operating from any allocation state to identify the highest value license 220 that can be freed upon the unregistration of a device 108 at a particular level.

In FIG. 6, a table 604 demonstrating that it is possible for a license 220 having a value of "any" to be released upon the unregistration of a lower release value device 108, including an R1 value device 108, is illustrated. In particular, in the example table 604 of FIG. 6, the variance calculated in accordance with embodiments of the present disclosure does not go to zero until the release value "any" is reached. Accordingly, if a device 108 having a release value anywhere between the represented levels of R1 to R7 unregisters, the result is that a license 220 having a value of "any" will become available. For instance, if an endpoint 108 having a release value of R4 unregisters, the last column 612 of the table 604, showing the best or highest level license 220 that can be released at each device 108 level, indicates that a license 220 having a value "any" should be released. This can be verified because there are eleven registered devices 108 having a level of R5 or greater, and there are thirteen licenses 220 having a level of R5 or greater in use, proving that there are sufficient licenses for the eleven R5 and greater devices, and two extra licenses for the R5 and lower value release devices.

In FIG. 7, a table 704 presents an exemplary system 100 state is presented in which the variance goes to zero at release level five, as shown in line 708a, and all of the R7 release licenses are in use, and no "any" release licenses, as shown in line 708b. In this example, if a device 108 having a release value of R5 or lower unregisters, an R5 license 220 will be released, as shown in the best column of that table 704. If a device 108 with a value of R6 unregisters, an R6 license 220 will be released. Likewise, if an R7 device 108 unregisters, an R7 license 220 will be released.

In FIG. 8, a table 804 presents another example system 100 state. At release levels R1 to R4, the variance is equal to zero. Therefore, upon the unregistration of a device at any level from R1 to R4, the license will be freed is equal to the level of the unregistering device 108. For an R5 or higher release device 108 that unregisters, an R7 license 220 is freed. This is because the variance is less than zero for release levels R5 and R6, and is equal to zero at release level R7. When an R6 device 108 unregisters, a license 220 having an R7 value is released, because the variance at R6 is not equal to zero. As a further example, if an R5 device 108 unregisters, an R7 license 220 is released, because the variance at R5 and R6 is less than zero.

In FIG. 9, yet another example system 100 state is illustrated in table 904. In this example, the highest device 108 release, here R7, is not using any R7 licenses 220. Instead, licenses 220 with the value of "any" are in use. Accordingly, if a device 108 with an R7 release value unregisters, a license 220 having a value of "any" is released. For devices 108 having a value of R6 or lower, unregistration results in the release of an R6 license, because the variance goes to zero at the R6 level, and is less than zero for releases R2 through R5 (and there are no devices registered at the R1 level) leaving a license with an R6 value as the best license that can be freed upon the unregistration of any device of release R2 through R6.

In FIG. 10, table 1004 illustrating another example system 100 state is shown. In this example, the unregistration of a device 108 having a release value of R7 results in a license 220 having a value of "any" being freed. If a device 108 having a value of R6 or lower unregisters, the value of the license 220 that is freed will be R6, because R6 is the level at which the variance is equal to zero. From this example, it can be appreciated that the short and the extra licenses at all release levels need to be considered, not just the sum of the licenses used and of registered endpoints, in order to determine the proper release value of the license 220 that is freed upon the unregistration of a device. In particular, if the number of licenses needed or extra per release were not calculated, the release of a license by an R6 device 108 would incorrectly result in the release of a "any" license 220.

FIG. 11 illustrates an example system 100 state 1104. Here, if a device 108 having a release value of R4 unregisters, the release value of the license 220 that is freed is R7. This is because the variance of the level equal to the level of the releasing device 108 and higher does not go to zero until the R7 level is reached. Accordingly, an R7 license 220 is the best license that can be released upon the unregistration of any device 108 with a release value of R6 or lower.

FIG. 12 illustrates an exemplary system 100 state 1204 in which a variety of different license 220 values can be freed. In particular, the variance of zero appears several times in the table. Moreover, the extra/short value is both positive and negative. In this example, only the unregistration of an R7 level device 108 can result in releasing an "any" license 220. R6 is the best license 220 to free upon the unregistration of an R5 or R6 device 108, and R4 is the best license 220 that can be released upon the unregistration of an R3 or an R4 level device 108.

FIG. 13 depicts an example system 100 state 1304 in accordance with embodiments of the present disclosure, with a variety of positive, negative and zero extra or short licenses at different release values. Moving up from the R2 release level, the variance first goes to zero at the R3 level. Therefore, upon the release of an R2 or an R3 device 108, an R3 license 220 is made available. At the R4 level, the variance is −1, but then goes to zero at the R5 level. Accordingly, upon the unregistration of an R4 or R5 device 108, an R5 license 220 is made available. At the R6 level, the variance remains zero. Accordingly, upon the unregistration of an R6 level device, an R6 license is released. From the R7 level and higher, the variance next goes to zero at the "any" level. Accordingly, upon the unregistration of an R7 or an R8 level device 108, a "any" license 220 is made available.

Although various examples have been provided in which release values of licenses and devices are represented numerically, other means of signifying relative value can be used. For example, letters, words or other symbols can be used, so long as there is ordering of value between them.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method, comprising:
    associating a plurality of licenses with a system having a plurality of devices, wherein each license in the plurality of licenses is associated with at least one of a plurality of release values, wherein each device in the plurality of devices is associated with one of the plurality of release values;
    registering by a license server at least some of the devices in the plurality of devices, wherein at least some of the licenses in the plurality of licenses are assigned to at least some of the devices in the plurality of devices;
    calculating by the license server a difference between a number of licenses and a number of registered devices at each of the plurality of release values; and
    in response to unregistration of a first device, beginning with a lowest release value, calculating by the license server a variance between used licenses and registered devices at each release value until a release value at which the calculated variance is equal to zero.

2. The method of claim 1, further comprising:
    in response to the unregistration of the first device, making available a license having a release value that is equal to or greater than the release value associated with the first device, wherein the release value of the license made available is the highest release value license that can be made available while continuing to associate a license to each of the registered devices, and allocating licenses of different release values to be dynamically allocated to the plurality of devices such that lowest value yet acceptable is assigned upon registration.

3. The method of claim 1, wherein the calculated variance is equal to zero at one release value, the method further comprising:
    in response to the unregistration of the first device associated with a release value that is equal to or less than the release value at which the calculated variance is equal to zero, making available a license with a release value equal to the release value at which the calculated variance is equal to zero.

4. The method of claim 3, wherein the release value of the license made available is greater than the release value of the unregistering first device.

5. The method of claim 1, wherein the calculated variance is equal to zero at more than one release value.

6. The method of claim 5, wherein the release value of the license made available is equal to or greater than the release value of the unregistering first device.

7. The method of claim 1, further comprising:
    receiving at the license server a request for a license from a second device, wherein the second device is allocated a license associated with a release value that is equal to or greater than the release value associated with the requesting second device.

8. The method of claim 7, wherein the license allocated to the requesting second device has release value that is the lowest value license from a set of licenses having a value that is equal to or greater than the release value of the requesting second device.

9. The method of claim 8, wherein the license server frees a license with a highest value possible while maintaining associations of each device that remain registered with a license.

10. The method of claim 1, further comprising:
in response to assigning a license to at least a second device, permitting a first licensed activity by the second device, wherein assignment of a license to the second device is required in order to perform the licensed activity.

11. The method of claim 10, wherein a device included in the plurality of devices is at least partially inoperable absent the association of a license having a release value that is equal to or greater than the release value of the first device.

12. The method of claim 1, wherein the devices included in the plurality of devices are communication endpoints.

13. The method of claim 1, wherein the steps of calculating a difference, calculating a variance, and identifying a release value are performed by the operation of application programming executed by the license server.

14. A licensing system, comprising:
a license server, including:
a processor;
memory;
a license store containing a plurality of licenses, wherein the license application is application programming operable to identify the release value of a license in the plurality of licenses to make available in response to unregistration of a device; and
a license application stored in the memory and executed by the processor;
a communication interface, wherein the license server is interconnected to a plurality of devices by the communication interface, wherein each device included in the plurality of devices is associated with one of the plurality of release values, wherein each license included in the plurality of licenses has one of a plurality of release values, wherein a number of licenses included in the plurality of licenses assigned to devices included in the plurality of devices is equal to or greater than a number of registered devices, wherein a difference between a number of licenses and a number of registered devices is calculated for each release value, and in response to the unregistration of the device, beginning at a lowest release value, a variance between used licenses and registered devices is calculated for each release value until a release value at which the calculated variance is equal to zero.

15. The system of claim 14, further comprising:
a network, wherein the network is interconnected to the communication interface of the license server; and
the plurality of devices, wherein the plurality of devices are interconnected to the network, and wherein at least some of the plurality of devices are associated with the license included in the plurality of licenses.

16. The system of claim 15, wherein the plurality of devices include communication endpoints, wherein each device in the plurality of devices is associated with a release value, and wherein the at least some of the plurality of devices are each associated with a license having a release value that is equal to or greater than a release value of the associated license.

17. The system of claim 16, wherein the communication endpoints include telephones.

18. A method for allocating licenses, comprising:
providing a license server;
associating a plurality of licenses with the license server, wherein each license included in the plurality of licenses is associated with at least one of a plurality of release values;
assigning by the license server a license to each of a number of devices included in a plurality of devices in response to a registration request, wherein each device in the plurality of devices has a release value selected from the plurality of release values, and wherein each device included in the plurality of devices requires association with a license from the plurality of licenses that has a release value equal to or greater than the release value of the device in order to operate;
calculating by the license server a difference between a number of assigned licenses and a number of registered devices for each release value in the plurality of release values;
in response to unregistration of a device included in the number of devices assigned a license, beginning with a lowest release value, calculating by the license server a variance between used licenses and registered devices for each release value until at least a first release value at which the variance is equal to zero; and
in response to the unregistration of the device included in the number of devices assigned a license, freeing a license for use by another device, wherein the release value of the freed license is at least equal to the identified first release value if the unregistering device has a release value that is less than or equal to the first release value.

19. The method of claim 18, wherein the release value of the unregistering device is greater than the identified first release value, and wherein the release value of the freed license is equal to the release value of the unregistering device.

20. The method of claim 18, wherein the variance is calculated to be zero at the first release value and at a second release value, wherein in response to the unregistration of the device the release value of the freed license is equal to:
a) the first release value if the release value of the device is less than or equal to the first release value; and
b) the second release value if the release value of the device is greater than the first release value and is less than or equal to the second release value.

* * * * *